May 16, 1950     F. W. SUHR     2,508,125
DYNAMOELECTRIC MACHINE
Filed April 16, 1948
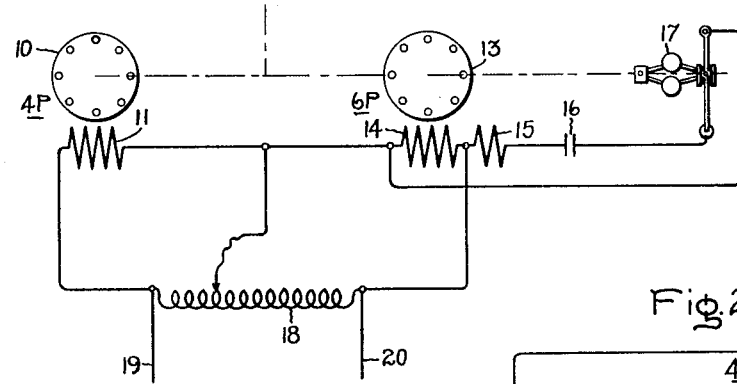
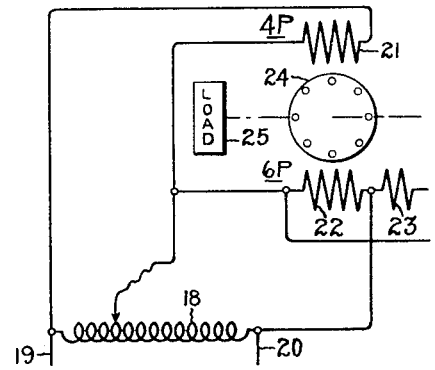
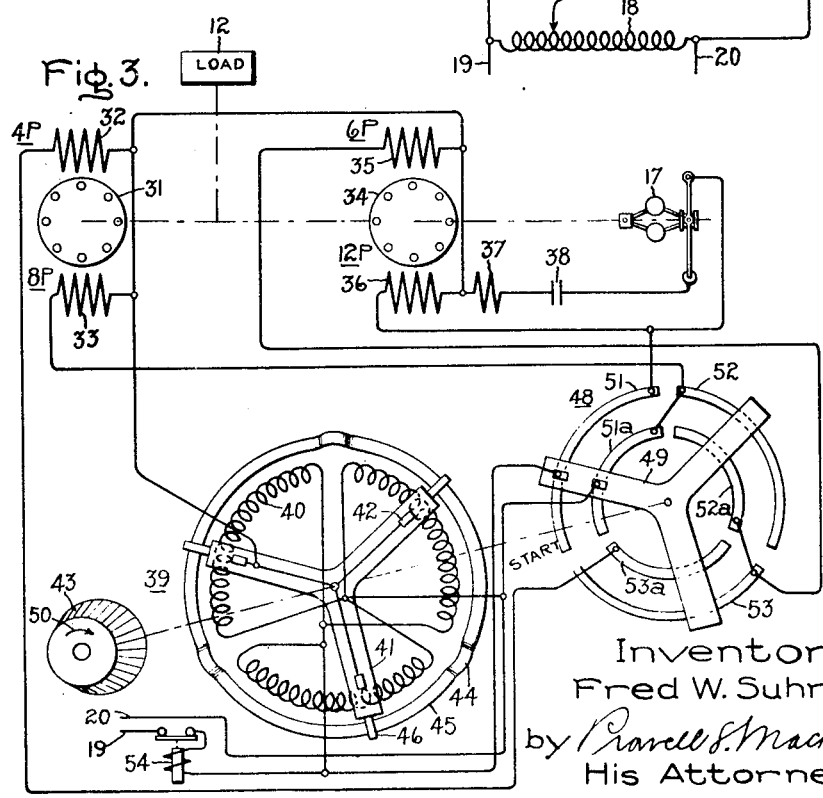
Inventor:
Fred W. Suhr,
by *Parcell S. Mack*
His Attorney.

Patented May 16, 1950

2,508,125

UNITED STATES PATENT OFFICE 2,508,125

DYNAMOELECTRIC MACHINE

Fred W. Suhr, Fort Wayne, Ind., assignor to General Electric Company, a corporation of New York Application April 16, 1948, Serial No. 21,440

5 Claims. (Cl. 318—46)

My invention relates to improvements in dynamoelectric machines and more particularly to dynamoelectric machines of the alternating current type which may be operated as adjustable speed motors.

It is well known that it is cheaper and more efficient to transmit and utilize electric power when so-called alternating currents are employed, but motors adapted to be used on alternating current systems lack the readily controllable flexibility in speed of operation of similar machines adapted to operate in conjunction with direct current power systems. The need of a simple variable speed A. C. motor has long been recognized, and heretofore various means have been used in an effort to make A. C. machinery adaptable to the great class of work conventionally performed by D. C. machines. Such methods in the past have presented many disadvantages, including the complexity and expense of construction, maintenance, and operation of the requisite equipment.

It is an object of this invention to provide simple and inexpensive means for overcoming these difficulties.

It is a further object of the present invention to provide a variable speed alternating current machine embodying one or more squirrel cage windings and, therefore, having no collector system involving a commutator or slip rings.

It is a still further object of the present invention to provide a low cost alternating current dynamoelectric machine together with a system of variable speed control therefor having good starting characteristics, ruggedness, serviceability and simplicity of control.

In the illustrated embodiments the means employed comprise at least one dynamoelectric machine squirrel cage rotor and at least two dynamoelectric machine stator windings having different numbers of electric poles. A. C. energy is fed to both of said stator windings and means, such as a potentiometer or autotransformer having an adjustable center connection made by a sliding brush, are provided for varying inversely and simultaneously the A. C. voltages supplied to the respective stator windings.

Other aspects of the invention will appear from consideration of the following description taken in connection with the accompanying drawing in which Fig. 1 shows an embodiment of my invention comprising two separate motor structures, Fig. 2 shows an embodiment of my invention comprising a single motor structure, and Fig. 3 shows two motor structures each having two field windings of different number of poles and arranged to employ the same basic principal as the scheme shown in Fig. 1 and Fig. 2, but affording a wider speed variation.

In Fig. 1, I have shown a diagrammatic representation of a circuit including two induction motor structures one of which has a squirrel cage winding 10 and a stator winding 11. This motor is assumed to be a 4 pole motor as indicated by the legend 4P on the drawing. Mechanically coupled to the 4 pole motor and to the same load 12 is the other motor structure having a squirrel cage winding 13, a main stator winding 14, and (since a single-phase system is described) a starting winding 15, starting capacitor 16 and centrifugally-operated starting circuit cutout switch 17. The motor having the main winding 14 and the squirrel cage winding 13 is a 6 pole motor as indicated by the legend 6P appearing on the drawing. Alternating current excitation is fed to the two main windings 11 and 14 from the ends and from an adjustable brush on a voltage divider such as an autotransformer 18 energized from a constant voltage alternating current supply such as that assumed applied to lines 19 and 20.

To study the operation of the machine indicated in Fig. 1, it is first obvious that with the adjustable tap of the transformer at line 19, full line voltage is applied to the 6 pole motor and no voltage is applied to the 4 pole motor, the stator power winding of which is short-circuited. It is assumed that the load 12 is within the rating of the 6 pole motor which will then come up to speed as its starting winding 15 is cut out by the centrifugal switch 17 at a predetermined value. The synchronous speed of a 6 pole motor, assuming a 60 cycle supply, is 1200 R. P. M., so that it may be assumed that the 6 pole motor will continue to accelerate until it reaches its load equilibrium speed of approximately 1150 R. P. M. If the variable contact of the transformer is moved to the right away from line 19, the applied voltage to the 6 pole motor is reduced and the 4 pole motor is provided with some voltage and will, at some point as this voltage is increased, develop torque. As the movable contact of the transformer is moved still further to the right, the voltage on the 4 pole motor is still further increased while that on the 6 pole motor is decreased and the 4 pole motor is supplying more and more of the torque tending to increase the speed of the combination toward the slip speed of a 4 pole motor or approximately 1720 R. P. M. At 1200 R. P. M., there is no slip in the 6 pole motor so that it supplies no torque and as speeds in excess of this value are attained, this motor may (proper conditions prevailing such as leading power factor excitation being provided by lines 19 and 20 as from the use of synchronous machines or capacitors— not shown) become a generator feeding back into the transformer. Thus this motor may be caused to act as a brake on the 4 pole motor (which then supplies the entire load) and this arrangement prevents too rapid an increase in speed of the system. When the movable contact of the transformer finally reaches the line 20, the 6 pole motor is short-circuited and the 4 pole motor carries the entire load at approximately 1720 R. P. M.

In Fig. 2, I have shown the 4 pole and 6 pole motors of Fig. 1 built into a single magnetic structure comprising a motor having a 4 pole stator power winding 21 which is designed to be mutually non-inductive with a 6 pole stator power winding 22. The motor also has a starting winding 23 and a squirrel cage rotor 24 mechanically connected to a load 25. As before, the motor is fed from a variable autotransformer 18 which is supplied from lines 19 and 20. The operation of the device shown in Fig. 2 is substantially the same as that of the device shown in Fig. 1.

In Fig. 3, I have shown a more elaborate scheme for obtaining considerably wider speed variation, but embodying the same basic principles just described. Fig. 3 could just as well show 4 separate induction motors, but for the purpose of economy I prefer using two rotors each associated with a stator core portion which is provided with two mutually non-inductive stator windings. Thus, a squirrel cage rotor 31 is associated with a stator core portion having a 4P stator winding 32 and an 8P stator winding 33 and a squirrel cage rotor 34 is associated with a magnetic core having a 6P stator winding 35, a 12P stator winding 36 and a starting winding 37 together with a starting capacitor 38 and centrifugal switch 17 so that the motor may be started as a 12 pole motor with a synchronous speed of 600 R. P. M. A suitable source of alternating current supply is furnished (from lines 19 and 20) to a circularly arranged autotransformer 39 which comprises three equal windings 40 connected in parallel across the power lines. A collector assembly 41 has a "three phase" arrangement and is provided with three equally spaced brushes 42 which contact similar points on the three windings 40. The collector assembly is rotated by manually turning a hand knob 43 and is provided with any conventional toggle means such as the peaked elevations 44 provided on a stationary support ring 45 and cooperating with springlike extensions 46 of the collector arms to cause a quick changeover from the end of one winding to the beginning of another and assure that the brushes will not dwell in an intermediate (open circuit) position. The three collector brushes 42 are electrically connected in parallel and to one side of all four main stator windings 32, 33, 35 and 36, so that rotation of the collector assembly will change the resistance in the one lead to all of these windings. The other side of 12P winding 36 is connected to an arc-like segment 51 of a switch mechanism 48 having a collector arm 49 mechanically connected to the collector assembly 41 so as to be rotatable therewith. The 8P winding 33 is connected to arc-like segments 52 and 51a, the 6P winding 35 is connected to arc-like segments 53 and 52a, and the 4P winding 32 is connected to arc-like segment 53a of the switch mechanism 48.

In operation, one complete revolution of the transformer arms 41 will make a complete change in speed from a 12 pole to a 4 pole speed. Upon starting it is desirable to have the arm slightly counterclockwise from the position shown in Fig. 3 so that full potential of line 20 will be collected by the arms 41 and delivered to the one side of all the main windings. At this condition the 12P winding 36 (and the starting circuit of winding 37) will be energized at full voltage while the 8P winding 33 will be short circuited and the windings 35 (6P) and 32 (4P) will be open circuited. To increase speed, the hand knob 43 is turned clockwise in the direction shown by arrow 50. At the intermediate position shown in Fig. 3, the voltage on the 12P winding is proportional to the distance from the line 19 ends of the transformer windings 40 to the brushes 42 and the voltage on the 8P winding is proportional to the distance from the line 20 ends of the transformer windings to the brushes. With further turning in the clockwise direction, the speed is further increased. When the brushes reach the line 20 end of the transformer windings the 12P winding is short circuited and the 8P winding receives full voltage. The speed is further increased as the control knob is further turned to cause the control apparatus to jump over to the next sector so that the 8P winding has full voltage (though of opposite polarity), the 6P winding is short circuited, and the 12P and 4P windings are open circuited. Further rotation of the control apparatus causes the 6P winding to take more and more of the load. In the third sector the 4P winding is brought into the circuit and with continued rotation of the control knob the speed increases until finally the 4P winding carries the entire load at about 1720 R. P. M.

A conventional overload circuit breaker 54 in one (or both) of the line wires will protect the equipment in case the operator attempts to start it in any position other than the proper "Start" position.

The arrangement of Fig. 3 permits a speed variation of from approximately 540 R. P. M. to 1720 R. P. M. More stages could be added if desired, but, of course, the cost will be increased as the number of stages is increased.

There is no reason for limiting the number of poles of the windings to the numbers thus far mentioned, nor is it necessary to limit the machine to single-phase excitation as shown.

It will be understood by those skilled in the art that the machine of any of the figures of the drawing is substantially a constant torque device, the torque at the lowest speed of operation being approximately the same as the torque at the highest speed of operation with a small drop in machine output between any two terminal speeds. To minimize this drop in output it is preferable to use a rotor (or rotors) having a higher-than-normal rotor resistance in order that maximum torque will be developed at, for example, 70% of any synchronous speed.

It is apparent from the above description of various embodiments of my invention and their operation, that there is thus provided a device capable of meeting the objects hereinabove set forth and capable of meeting a part of the present great demand for a simple adjustable speed alternating current motor which will be useful for many applications.

While I have illustrated and described particular embodiments of my invention, modifications thereof will occur to those skilled in the art.

I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A single phase dynamoelectric machine having a squirrel cage rotor and having a magnetic stator core portion provided with two stator windings having a different number of poles, and a single adjustable tap autotransformer adapted to be energized by a single phase source of alternating current power and interposed between said source and said stator windings, whereby the A. C. voltage supplied to the respective windings may be varied inversely and simultaneously and said dynamoelectric machine operated as a variable speed motor.

2. A speed control system comprising an alternating current squirrel cage induction motor having a stationary portion and a rotor portion, said stationary portion having a stator power winding of a predetermined number of poles, an alternating current squirrel cage induction motor having a stationary portion having a stator power winding of a different number of poles, and said second mentioned motor having a rotor portion mechanically interconnected to said first mentioned motor rotor, and a voltage divider having a winding contacted by an adjustable brush connected to one end of each of said stator power windings, the outer ends of said voltage divider winding being connected, respectively, to the other ends of said stator power windings.

3. A speed control system comprising an alternating current squirrel cage induction motor having at least two stator power windings having a different number of poles, and an autotransformer having at least one adjustable center connection, and means for connecting said stator power windings to different portions of said autotransformer circuit whereby the amount of voltage taken from a selected portion of the autotransformer and supplied to the stator winding associated therewith may be varied inversely and simultaneously with respect to voltage supplied from any other autotransformer portion to any other stator winding.

4. A speed control system comprising an alternating current squirrel cage induction motor having at least two stator power windings having a different number of poles, an additional squirrel cage induction motor having at least two stator power windings having a number of poles different from each other and different from the windings on said first motor, said motors being mechanically interconnected to each other and adapted to be connected to a load, a voltage divider comprising a rotatable collector assembly having three equally spaced brushes contacting comparable points on three electrically paralleled windings, with said collector rotatable with a switch contacting a plurality of arcuate rings to provide a switching means, toggle means to provide a quick change over from the end of one winding to the beginning of another, and means interconnecting the respective stator windings through the switching means and through the voltage divider, whereby rotation of said collector will cause the machine to vary its speed of operation.

5. A dynamoelectric machine having a plurality of mechanically interconnected squirrel cage induction motor rotors, a plurality of magnetic stationary core portions each arranged to cooperate with one of said squirrel cage rotors, a plurality of stator windings on each of said stationary core portions having a different number of poles than at least one other stator winding on the same stationary core portion and having a different number of poles than the stator windings on other stationary core portions, an adjustable voltage dividing device adapted to be energized from an alternating current source, selector switching means, and connections from said stator windings to said selector switching means and to said voltage divider, whereby manipulation of said voltage divider and switching means will cause said machine to operate over the entire range provided by separate energization of the respective stator windings.

FRED W. SUHR.

REFERENCES CITED

The following references are of record in the file of this patent:

UNITED STATES PATENTS

| Number | Name | Date |
|---|---|---|
| 606,056 | Hassler | June 21, 1898 |
| 882,581 | Pauly | Mar. 24, 1908 |
| 1,427,360 | Chubb | Aug. 29, 1922 |
| 1,627,330 | Hineline | May 3, 1927 |